UNITED STATES PATENT OFFICE.

WILLIAM A. McADAMS, OF BROOKLYN, NEW YORK.

SOLDER.

SPECIFICATION forming part of Letters Patent No. 669,425, dated March 5, 1901.

Application filed June 10, 1899. Serial No. 720,072. (No specimens.)

*To all whom it may concern:*

Be it known that I, WILLIAM A. MCADAMS, a citizen of the United States, and a resident of the borough of Brooklyn, in the city of New York and State of New York, have invented a new and useful Improvement in Solder, of which the following is a specification.

My invention relates to an improvement in solder, and more particularly to a solder adapted to unite aluminium and its alloys.

The solder is composed of zinc, cadmium, and mercury, preferably in the proportions of about two parts of zinc to each part of cadmium, with mercury forming about eight per cent. of the whole. These proportions may, however, be varied according as it is desired to make the melting-point of the solder higher or lower. For example, if the melting-point is to be raised the proportion of zinc may be increased and the percentage of mercury decreased, one or both, and if the melting-point is to be lowered the proportion of zinc may be decreased and the percentage of mercury increased, one or both.

In preparing the solder I find it convenient to first melt the cadmium, then introduce the zinc in fine bits or thin strips into the melted cadmium in order that the latter may not be raised to a point where it will suffer injury from burning, and the mercury is then introduced into the melted cadmium and zinc, while the latter is maintained at a temperature sufficiently low to prevent the mercury from vaporizing.

It is well known that mercury forms an alloy rather than amalgam with cadmium, so that it is held tightly in the mixture, and yet when the latter is melted, as in the process of soldering, the mercury causes the solder to spread freely over the surfaces and gives the solder what is commonly termed in the art a strong "biting" effect upon the pieces to be soldered.

This solder may be used in the same manner as ordinary solder and with the ordinary soldering-iron, either by melting the solder with the nose of the soldering-iron and spreading it over the surfaces to be united and then placing the soldering-iron on the pieces to melt the solder between the faces of the pieces to be soldered, or a thin piece of the solder may be laid in its cold state between the pieces to be soldered and the soldering-iron laid on the back of one of the pieces and held there until the temperature of the pieces to be soldered has been raised to a point sufficient to melt the solder between them, when the work will be accomplished.

This solder when used in connection with aluminium and its alloys, particularly its alloys of zinc and copper, reduces the galvanic action to a minimum because of the kindred nature electrically of the zinc, cadmium, and aluminium.

I further find that it is desirable to use chemically-pure zinc in making the solder in order that no trace of lead may remain, as this would prove highly injurious or fatal to the utility of the solder.

By varying the proportions of zinc, cadmium, and mercury, as hereinabove stated, a solder may be produced which will melt at a point as low as 227° centigrade or as high as 300° centigrade, as may be desired. For example, if the proportions be zinc sixty-one per cent., cadmium thirty and one-half per cent., and mercury eight and one-half per cent. the solder will melt at 310° centigrade, or if the zinc be thirty-four per cent., cadmium thirty-four per cent., and mercury thirty-two per cent. the solder will melt at 222° centigrade.

What I claim is—

A solder composed of zinc, cadmium and mercury.

In testimony that I claim the foregoing as my invention I have signed my name, in presence of two witnesses, this 8th day of June, 1899.

WILLIAM A. McADAMS.

Witnesses:
FREDK. HAYNES,
C. S. SUNDGREN.